US009661867B2

United States Patent
Minard et al.

(10) Patent No.: US 9,661,867 B2
(45) Date of Patent: May 30, 2017

(54) SOFT-SERVE DISPENSING MACHINE WITH FREEZER DRAWERS

(71) Applicant: Carrier Commercial Refrigeration, Inc., Farmington, CT (US)

(72) Inventors: James J. Minard, Roscoe, IL (US); Thomas J. Franken, Roscoe, IL (US)

(73) Assignee: CARRIER COMMERCIAL REFRIGERATION, INC., Farmington, CT (US)

( * ) Notice: Subject to any disclaimer, the term of this patent is extended or adjusted under 35 U.S.C. 154(b) by 167 days.

(21) Appl. No.: 14/380,265

(22) PCT Filed: Feb. 21, 2013

(86) PCT No.: PCT/US2013/027044
§ 371 (c)(1),
(2) Date: Aug. 21, 2014

(87) PCT Pub. No.: WO2013/126515
PCT Pub. Date: Aug. 29, 2013

(65) Prior Publication Data
US 2015/0034668 A1 Feb. 5, 2015

Related U.S. Application Data

(60) Provisional application No. 61/602,795, filed on Feb. 24, 2012.

(51) Int. Cl.
*B67D 7/80* (2010.01)
*A23G 9/28* (2006.01)
(Continued)

(52) U.S. Cl.
CPC ............ *A23G 9/281* (2013.01); *A23G 9/103* (2013.01); *A23G 9/222* (2013.01); *A23G 9/225* (2013.01);
(Continued)

(58) Field of Classification Search
CPC ........ A23G 9/281; A23G 9/103; A23G 9/222; A23G 9/225; A23G 9/227; A23G 9/28; F25D 25/02; F25D 25/024; F25D 25/025
(Continued)

(56) References Cited

U.S. PATENT DOCUMENTS 1,531,558 A * 3/1925 Lehmann .............. F25D 25/025
312/334.39
2,033,792 A * 3/1936 Sywert .................. F25D 25/024
126/339
(Continued)

FOREIGN PATENT DOCUMENTS

EP       0560481 A2   9/1993
GB       642085 A     8/1950
(Continued)

OTHER PUBLICATIONS

International Preliminary Report on Patentability for application PCT/US2013/027044, issued Aug. 26, 2014, 9 pages.

*Primary Examiner* — J. Casimer Jacyna
*Assistant Examiner* — Benjamin R Shaw
(74) *Attorney, Agent, or Firm* — Cantor Colburn LLP

(57) ABSTRACT

A product dispensing apparatus includes a first drawer assembly including a first drawer containing a first product; and one or more refrigerated cylinders that is operable to receive the first product; where the first drawer is selectively movable from a first position to a second position, the second position extending outwards and away from the first position.

18 Claims, 3 Drawing Sheets

(51) Int. Cl.
  *A23G 9/10* (2006.01)
  *A23G 9/22* (2006.01)
  *F25D 25/02* (2006.01)

(52) U.S. Cl.
  CPC .............. *A23G 9/227* (2013.01); *A23G 9/28* (2013.01); *F25D 25/02* (2013.01); *F25D 25/025* (2013.01); *F25D 2325/021* (2013.01)

(58) Field of Classification Search
  USPC ................. 222/1, 146.6; 62/391, 342, 389
  See application file for complete search history.

(56) References Cited

U.S. PATENT DOCUMENTS

| | | | |
|---|---|---|---|
| 2,033,860 A * | 3/1936 | Otte | F25D 25/024 |
| | | | 108/137 |
| 2,408,704 A | 10/1946 | Taylor | |
| 2,914,218 A | 11/1959 | Korodi | |
| 3,196,633 A * | 7/1965 | Rapazzini | A23G 9/20 |
| | | | 62/136 |
| 3,874,189 A | 4/1975 | Calim | |
| 3,898,859 A | 8/1975 | Duke | |
| 4,022,031 A | 5/1977 | Calim | |
| 4,420,948 A * | 12/1983 | Savage | A23G 9/28 |
| | | | 425/150 |
| 5,048,724 A | 9/1991 | Thomas | |
| 5,149,551 A | 9/1992 | Anderson | |
| 5,215,222 A | 6/1993 | McGill | |
| 5,244,277 A | 9/1993 | Broussalian et al. | |
| 5,400,614 A | 3/1995 | Feola | |
| 5,405,054 A | 4/1995 | Thomas | |
| 5,421,484 A | 6/1995 | Beach | |
| 5,492,249 A | 2/1996 | Beach | |
| 5,494,194 A | 2/1996 | Topper et al. | |
| 5,505,336 A | 4/1996 | Montgomery et al. | |
| 5,553,756 A | 9/1996 | Topper et al. | |
| 5,564,601 A | 10/1996 | Cleland et al. | |
| 5,788,120 A | 8/1998 | Stumler | |
| 6,082,590 A | 7/2000 | Dorsey et al. | |
| 6,220,047 B1 | 4/2001 | Vogel et al. | |
| 6,299,025 B1 | 10/2001 | Watanabe et al. | |
| 6,308,522 B1 | 10/2001 | Jones et al. | |
| 6,390,334 B1 | 5/2002 | Kim et al. | |
| 6,435,377 B1 | 8/2002 | Iwata et al. | |
| 6,490,872 B1 * | 12/2002 | Beck | A23G 9/045 |
| | | | 62/303 |
| 6,553,779 B1 | 4/2003 | Boyer et al. | |
| 6,604,654 B2 | 8/2003 | Staten et al. | |
| 6,637,214 B1 | 10/2003 | Leitzke et al. | |
| 6,761,285 B2 | 7/2004 | Bertone | |
| 6,938,801 B1 | 9/2005 | Reddy et al. | |
| 7,076,966 B2 | 7/2006 | Mullen | |
| 7,147,134 B2 * | 12/2006 | Gutierrez | B67D 1/0004 |
| | | | 222/146.1 |
| 7,360,670 B2 | 4/2008 | Goepfert | |
| 7,448,516 B2 | 11/2008 | Davis et al. | |
| 7,681,761 B2 | 3/2010 | Harra | |
| 7,802,593 B2 * | 9/2010 | Koerner | G07F 17/0071 |
| | | | 141/104 |
| 2002/0023457 A1 * | 2/2002 | Cunha | A23G 9/045 |
| | | | 62/342 |
| 2002/0189269 A1 * | 12/2002 | Midden | A23G 9/045 |
| | | | 62/136 |
| 2004/0251270 A1 * | 12/2004 | Davis | A23G 9/281 |
| | | | 222/2 |
| 2007/0131711 A1 * | 6/2007 | Minard | B65D 21/0223 |
| | | | 222/105 |
| 2007/0228246 A1 * | 10/2007 | Starcher | A47B 97/08 |
| | | | 248/460 |
| 2007/0251260 A1 * | 11/2007 | Baxter | A21B 7/00 |
| | | | 62/342 |
| 2009/0191318 A1 * | 7/2009 | Cocchi | A23G 9/04 |
| | | | 426/231 |
| 2009/0320508 A1 * | 12/2009 | Linder | A47F 3/04 |
| | | | 62/251 |
| 2010/0028501 A1 | 2/2010 | Baxter et al. | |
| 2010/0205992 A1 * | 8/2010 | Morris | F25D 25/025 |
| | | | 62/246 |
| 2010/0247723 A1 | 9/2010 | Rudolph | |
| 2011/0061420 A1 * | 3/2011 | Anderson | A23G 9/045 |
| | | | 62/389 |
| 2012/0055189 A1 * | 3/2012 | Sipp | A23G 9/045 |
| | | | 62/342 |

FOREIGN PATENT DOCUMENTS

WO 0125135 A1 4/2001
WO 2012007770 A2 1/2012

* cited by examiner

SOFT-SERVE DISPENSING MACHINE WITH FREEZER DRAWERS

FIELD OF INVENTION

The subject matter disclosed herein relates generally to an apparatus for dispensing shakes or soft serve products, and more particularly, to an apparatus having one or more drawer assemblies or cabinet with racks for holding refrigerated and/or non-refrigerated dairy mixes, syrups, and flavorings while providing easy access to the mixes, syrups, and flavorings during replenishment of the one or more drawer assemblies.

DESCRIPTION OF RELATED ART

Soft serve frozen confections are widely used in the food industry and have a broad customer appeal. Although ice creams are the most widely known product dispensed in a soft serve form, an expanding market based for alternative frozen confections like yogurts also exists. A soft serve frozen confection is dispensed as a blended product from a refrigerated or non-refrigerated mix and one or more syrups through extrusion of the product into an edible cone or other suitable container. The soft serve frozen confection is generally intended for immediate consumption.

Typically, a soft-serve product dispensing machine houses a lower portion for storage of syrups, while an upper portion includes two large refrigerated hoppers for holding liquid dairy mix. Generally, the hoppers are accessed from a top surface of the machine, which is, typically, around 5 feet off the ground. In order to produce the soft-serve product, the syrups and liquid dairy mixes are blended together in a mixer with air and under an appropriate temperature. The liquid dairy mix is typically supplied in 2.5-gallon containers, which weighs around 18 pounds (around 8.2 Kilogram). To replenish the supply of dairy mix in the refrigerated hoppers, a user must lift the heavy dairy mix above his head and into the hopper access point on the top surface. Due to location of the access point, a user may blindly pour the mix in the general vicinity of the opening, which usually results in over filling or spillage. As a result, the user has to expend additional time and effort to clean any product that has spilled around the dispensing machine beyond what is required to fill the machine with dairy mix. Also, the hopper openings are susceptible to contamination such as, for example, dust from the environment if the hopper covers are not in place over the hopper openings. In view of these limitations, the soft-serve product dispensing machine is not ergonomically efficient to the user. Improvements in a shake or a soft-serve product dispensing machine would be well received in the art.

BRIEF SUMMARY

According to one aspect of the invention, a product dispensing apparatus, includes a first drawer assembly including a first drawer containing a first product; and one or more refrigerated cylinders that is operable to receive the first product; wherein the first drawer is selectively movable from a first position to a second position, the second position extending outwards and away from the first position.

According to another aspect of the invention, a method of dispensing a product, includes providing a first drawer assembly including a first drawer containing a first product; and providing one or more refrigerated cylinders that is operable to receive the first product; and providing at least one dispensing station fluidly coupled to the one or more refrigerated cylinders, the one or more refrigerated cylinders operable to dispense at least the first product; wherein the first drawer is selectively movable from a first position to a second position, the second position extending outwards and away from the first position According to another aspect of the invention, a method of operating a product dispensing apparatus includes opening a first drawer from a first position to a second position, the second position extending outwards and away from the first position; placing a first product in the drawer; coupling the first product to a refrigerated cylinder of the product dispensing apparatus, the refrigerated cylinder operable to receive the first product; and moving the first drawer to the first position.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a soft-serve product dispensing machine include a housing having at least one refrigeration system and one or more drawer assemblies for holding refrigerated and non-refrigerated products such as mixes, syrups, or flavorings. In embodiments, the drawer assemblies may be horizontally oriented one above the other, vertically oriented in a side-by-side configuration, or positioned as two or more drawers in a side-by-side configuration that are oriented horizontally. In an embodiment, an upper drawer assembly is located in close proximity to a refrigeration system that cools or refrigerates the contents of the upper drawer assembly. Additionally, the product dispensing machine may contain pumps coupled to one or more refrigerated cylinders for selectively cooling the mixes or syrups located within one or more of the drawer assemblies. In an embodiment, the upper drawer assembly resides at an ergonomic above the floor so that the user does not have to bend or extend his body substantially beyond a normal standing position when placing a new mix bag or container into the upper drawer assembly. In another embodiment, a cabinet including a plurality of racks contained therein may be provided for receiving one or more products.

Figure 1:
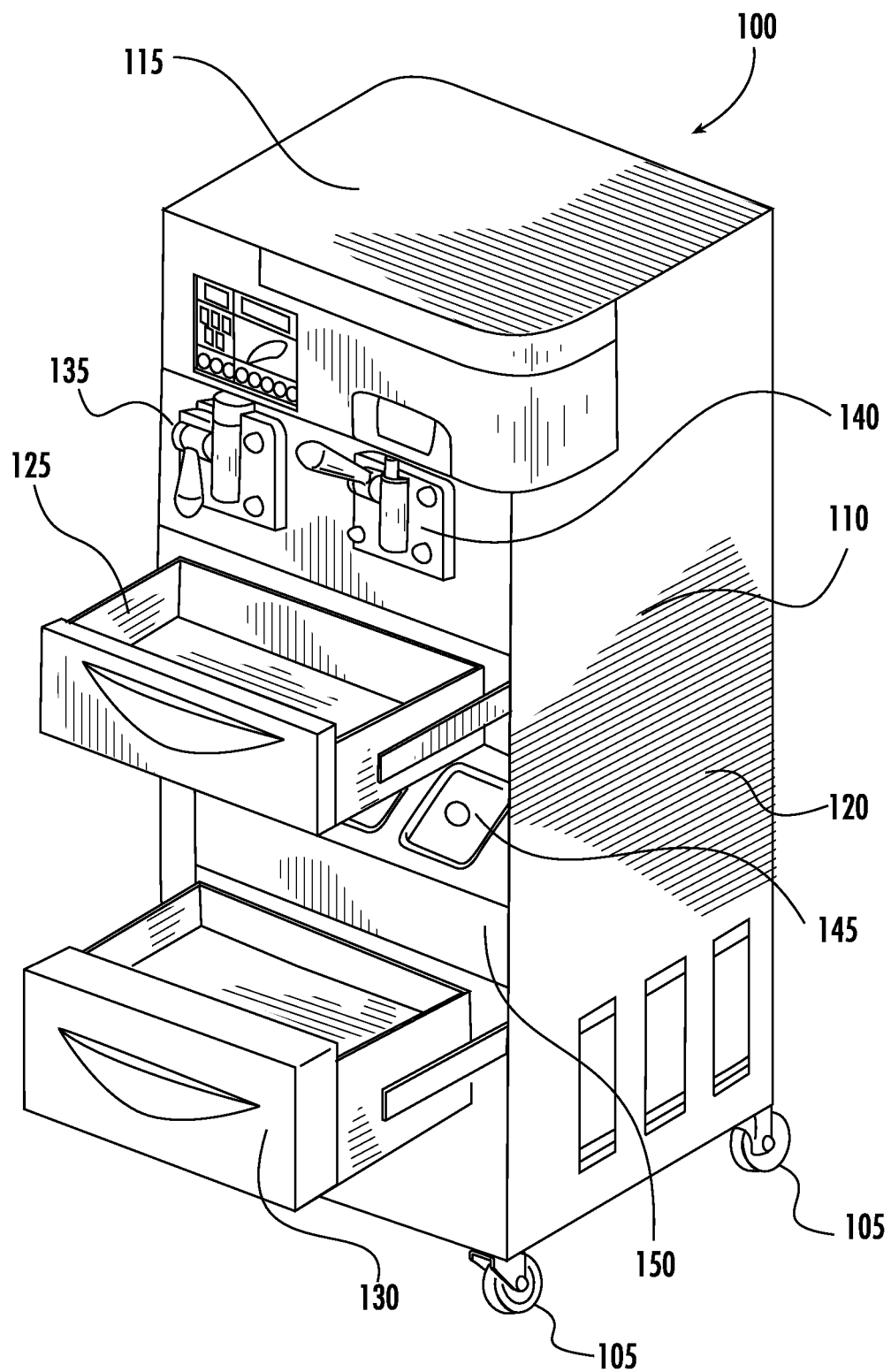
FIG. 1 depicts a front perspective view of product dispensing machine showing the selectively extendable drawer assemblies according to an embodiment of the invention.

Referring now to the drawings, FIG. 1 depicts a front perspective view of a soft-serve product dispensing machine 100 including a refrigeration system and one or more selectively extendable drawer assemblies according to an embodiment of the invention. As shown, the product dispensing assembly 100 is adapted to sit on a floor of a food service establishment, and may have casters 105 to facilitate its movement on the floor. The product dispensing machine 100 includes a housing 110 housing one or more refrigeration systems (shown in FIG. 2). The housing 110 includes, in one embodiment, a top wall 115, a bottom wall (not shown), two substantially similar sidewalls 120, a front wall 150, and a rear wall (not shown). The one or more refrigeration systems (shown in FIG. 2) can be energized by a power source for cooling or refrigerating an interior cavity defined by the housing 110 and any contents housed within. In some non-limiting examples, the one or more refrigeration systems (shown in FIG. 2) may be energized by an AC supply, DC supply, battery, fuel cell, AC or DC generator, solar power, or the like.

Further, housing 110 includes one or more drawer assemblies. In one non-limiting embodiment, the housing 110 is shown with an upper drawer assembly 125 and a lower drawer assembly 130 that may be accessible from the front wall 150. In another embodiment, the respective upper and lower drawer assemblies 125, 130 may be accessible from a rear wall that is diametrically opposite front wall 150. As shown in FIG. 1, the drawer assemblies 125, 130 are horizontally oriented across the width of the housing 110 with the upper drawer assembly 125 being located above the lower drawer assembly 130. In other non-limiting embodiments, the housing 110 may include side-by-side horizontally oriented drawers that are substantially similar to upper drawer assembly 125 in lieu of providing a single upper drawer assembly 125, two or more side-by-side horizontally oriented drawers that are substantially similar to lower drawer assembly 130 in lieu of providing a single lower drawer assembly 130, two or more side-by-side vertical drawers that span substantially the length of the housing 110, or a combination of horizontal and vertically oriented drawers. In an example, the vertical drawers may each include rods that may be positioned either horizontally or at various angles in order to facilitate syrup or mix evacuation. The rods receive hooks that are attached to the refrigerated and/or non-refrigerated syrups and mixes and facilitate product evacuation either vertically or at an angle. It is to be appreciated that the upper and lower drawer assemblies 125, 130 may contain refrigerated and/or non-refrigerated mixes and syrups, which are stored in convenient bags. But, in other embodiments, the mixes and syrups may be contained in jugs, cartons, reusable vessels, cans, or the like without departing from the scope of the invention. In other non-limiting examples, the machine 100 may also be used for dispensing iced beverages, juice products, frozen carbonated and/or non-carbonated beverages, or the like from bags or containers that are housed within housing 110.

As shown in FIG. 1, the upper drawer assembly 125 resides above the lower drawer assembly 130. Also, the upper and lower drawer assemblies 125, 130 reside within an interior cavity of the housing 110 and may be extendable outwards (i.e., away from front wall 150). In one embodiment, the upper drawer assembly 125 sits at a height of about 45 inches above the ground. This height above the ground resides between the knees and shoulders of a user, which is typically referred to as the "power zone" for lifting and the "safety zone" for push/pull motions. As such, the upper drawer assembly 125 is at an ergonomic height above the floor and the user does not have to bend or extend his body substantially beyond his normal standing position when placing a new mix bag into the upper drawer assembly 125. Also shown, in an embodiment, the upper drawer assembly 125 may be coupled to an interior cavity of the housing 110 through a plurality of substantially similar rails 205, 210 (shown in FIG. 2). The rails 205, 210 facilitate selectively extending the upper drawer assembly 125 from a closed position (not shown) to a fully extended position (as shown in FIG. 1). In other non-limiting embodiments, the upper drawer assembly 125 may include slots that guide/slide over complementary shaped grooves in the housing 110, thereby facilitating selectively extending or retracting the upper drawer assembly 125. Also, lower drawer assembly 130 sits at a height of about 24 inches above the ground and is coupled to the interior cavity of the housing 110 through a plurality of substantially similar rails 250, 255 (shown in FIG. 2). In another non-limiting embodiment, the lower drawer assembly 130 may include slots that guide/slide over complementary shaped grooves, thereby facilitating selectively extending or retracting the lower drawer assembly 130. In other embodiments, the upper and lower drawer assemblies 125, 130 may be provided at various heights with respect to the position from the floor without departing from the scope of the invention. The rails 250, 255 facilitate selectively extending the lower drawer assembly 130 from a closed position (not shown) to a fully extended position. It is to be appreciated that drawer assemblies 125, 130 can be positioned at an ergonomic height, thereby facilitating ease of access to the supplies and dairy mixes that are stored in the drawer assemblies 125, 130.

Also shown in FIG. 1, product dispensing machine 100 includes a plurality of dispensing stations 135, 140 at an upper front center of the housing 110 for use in dispensing, in some examples, iced beverages, shakes, or soft-serve products to customers. In an embodiment, the product dispensing machine 100 includes a refrigeration system (not shown) contained within the cavity of the housing 110. The refrigeration system is utilized for keeping the contents of one or more of the drawer assemblies 125, 130 refrigerated, but, in another embodiment, the refrigeration system may be de-energized if the contents of one or more of the drawer assemblies 125, 130 are to non-refrigerated. This includes holding the refrigerated and/or non-refrigerated mixes and syrups and the products dispensed from dispensing stations 135, 140 at the user defined temperature. An additional refrigeration system dedicated for keeping the one or more refrigeration cylinders 235, 240 (FIG. 2) cold may also be provided in another embodiment. In addition, the refrigeration system provides supplemental heat from, in one embodiment, a condenser of the refrigeration system for heating food toppings such as, for example, chocolate or chocolate syrup that are provided in a plurality of substantially similar condiment jars 145. In some embodiments, the refrigeration system can include a roll-bond evaporator, forced air, cold wall conduction, or similar methods. In the non-limiting example shown in FIG. 2, the refrigeration system is depicted with a refrigerant coil 215 (shown in FIG. 2) such as, for example, a roll bond evaporator that is provided inside housing 110 for maintaining a cold temperature (for example, 41 degrees Fahrenheit or lower) inside upper drawer assembly 125. It should be appreciated that the selectively extendable drawer assemblies 125, 130, which contain a plurality of mixes and syrups in convenient bags, may be extended outwards (i.e., away from the cavity contained within housing 110) and provide access to the contents of the drawer assemblies 125, 130 during refilling and cleaning. Also, selectively extending the drawer assemblies 125, 130 outwards also provides access, in another example, to the plurality of tubes that connect the refrigerated mixes and syrups, in the drawer assemblies 125, 130, to the dispensing stations 135, 140. The product dispensing machine 100, in one embodiment, may include a hose to connect the machine to a sanitizing station in order to transport hot water and sanitizer from the sanitizing station to each of the drawer assemblies 125, 130.

Figure 2:
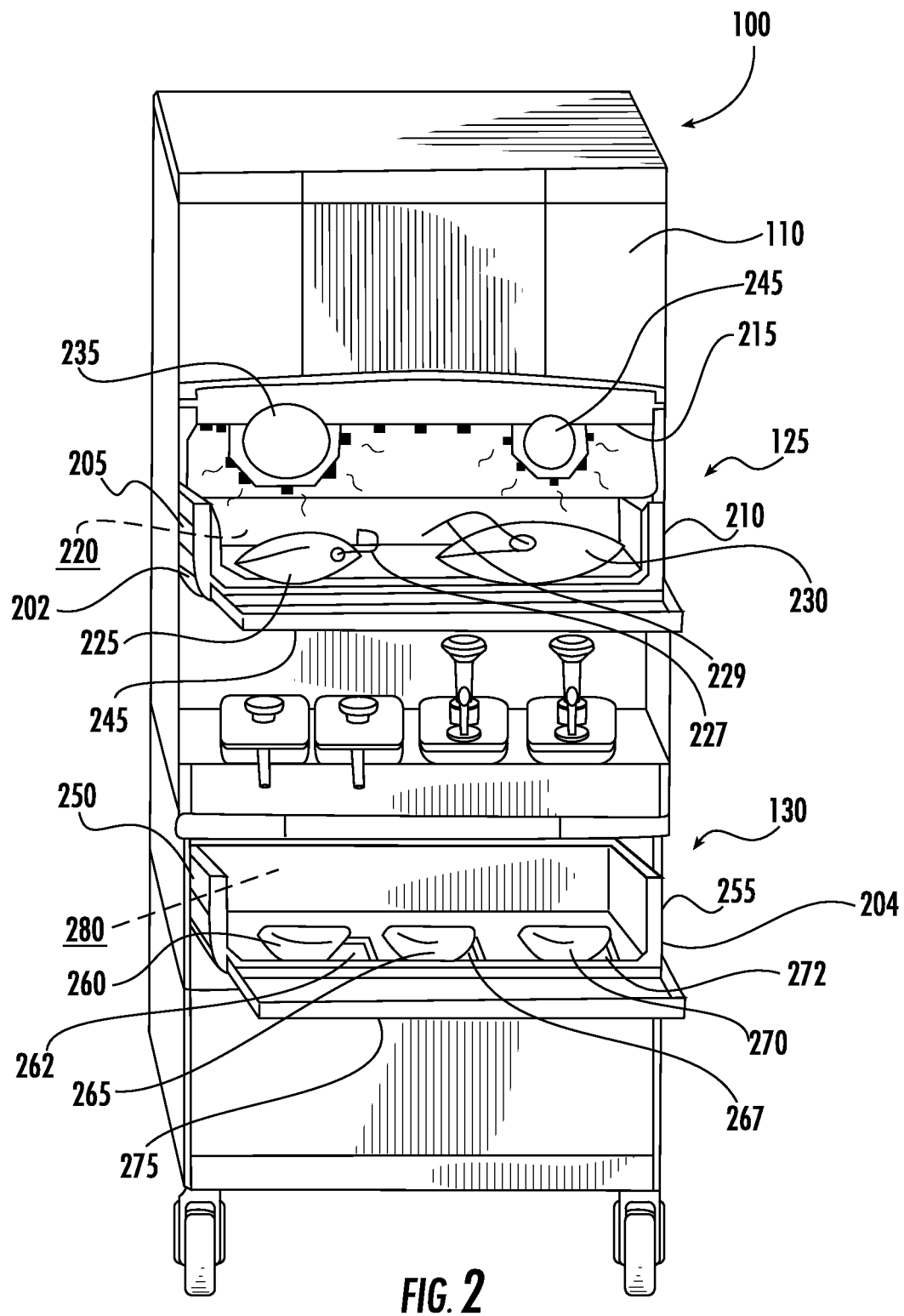
FIG. 2 depicts a perspective view of the soft-serve product dispensing machine of FIG. 1 with the drawer assemblies in an extended position according to another embodiment of the invention.

FIG. 2 illustrates a front perspective view of the product dispensing machine 100 having the housing 110 housing the upper and lower drawer assemblies 125, 130 according to an embodiment of the invention. The upper drawer assembly 125 includes a drawer 202, which may be selectively extended outwards or inwards by the plurality of rails 205, 210. The drawer 202, once extended outwards, provides ease of access to drawer cavity 220 containing supplies. The drawer 202 may be insulated along its bottom, rear, and side walls in order to maintain a temperature inside the cavity 220 of drawer 202 and/or minimize the loss of temperature from inside the cavity 220 during an unexpected loss of power to the product dispensing machine 100. The cavity 220 may contain a plurality of products such as, for example, mixes, syrups, and/or flavorings. In one non-limiting example, the cavity 220 may contain a plurality of mix bags that remain refrigerated such as, for example refrigerated mix bags 225, 230 containing liquid dairy mix, but, in other non-limiting examples, drawer 202 may also contain refrigerated mixes in jugs, cartons, reusable vessels, cans, or the like. The selectively extendable upper drawer assembly 125 may be coupled to a pump (not shown) that connects tubing 227, 229 from the respective mix bags 225, 230 to refrigerated cylinders 235, 240. The upper drawer assembly 125 may be in close proximity or near the refrigerated cylinders 235, 240. In an embodiment, any of the mix bags 225, 230 may be connected with the tubing 227, 229 to an internal vessel for further cooling or holding prior to going to the refrigerated cylinders 235, 240. In some non-limiting embodiments, the upper drawer assembly 125 may be positioned higher than is shown in FIG. 2 when a pump is not used to dispense contents from the mix bags 225, 230. In an embodiment, additional mix bags that are substantially similar to bag 225 may be provided within cavity 220. In an embodiment, the cavity 220 may be compartmentalized (i.e., divided into individual housing cavities) by providing a plurality of rectilinear walls (not shown) in order to partition the cavity 220. Also, the upper drawer assembly 125 and its contents may be refrigerated through, in one embodiment, a roll bond evaporator 215 for cooling the cavity 220. The roll bond evaporator 215 is located in proximity to the mix bags 225, 230 within the cavity 220 along the inside top surface of the housing 110. In other non-limiting embodiments, the upper drawer assembly 125 may be refrigerated through ducts and a forced air evaporator, direct contact with refrigeration coils via a cold wall construction, or through thermoelectric cooling such as a solid-state active heat pump (also called a Peltier device) without departing from the scope of the invention. In one example, the drawer assembly 125 includes a gate portion 245 connected to the drawer 202 that may be selectively folded open (i.e., away from front wall 150 as shown in FIG. 1) in order to access the cavity 220 or selectively closed towards front wall 150 (FIG. 1) in order to prevent access to the cavity 220.

Also, the lower drawer assembly 130 is shown having a drawer 204 that can be selectively extended outwards or inwards with a plurality of rails 250, 255. In other non-limiting embodiments, guides, rods, or a standard box-in-box configuration without guides may be provided to selectively extend outwards and close the lower drawer assembly 130. The drawer 204, once extended outwards, provides ease of access to supplies located within. The drawer 204 may contain non-refrigerated products such as, for example, syrups and/or flavorings. In one non-limiting example, the drawer 204 may contain one or more non-refrigerated syrup bags such as, for example, syrup bags 260, 265. 270 containing liquid syrup, but, in other embodiments, the drawer 204 may also contain syrups in jugs, cartons, reusable vessels, cans, or the like. The selectively extendable upper drawer assembly 125 may be coupled to a pump (not shown) that connects to tubing 262, 267, 272 from the respective syrup bags 260, 265, 270 but, in another non-limiting embodiment, a pump is not required to dispense syrup from the bags 260, 265, 270. Extending drawer 204 outwards also provides access to a pump (not shown) and tubing 262, 267, 272 that connects, in one non-limiting example, the respective syrup bags 260, 265, 270 to refrigerated cylinders that cool the contents of the syrup bags 260, 265, 270. In an embodiment, any of the syrup bags 260, 265, 270 may be connected with the tubing 262, 267, 272 to an internal vessel for further cooling or holding prior to going to the refrigerated cylinders 235, 240 for mixing with the mix bags 225, 230. In an embodiment, the lower drawer assembly 125 may be positioned higher than is shown in FIG. 2 when a pump is not used to dispense contents from the mix bags 225, 230. Further, the drawer assembly 125 includes, in an embodiment, a gate portion 275 that attached to the drawer 204 and may be selectively folded open (i.e., away from front wall 150) in order to complement the ease of access to the cavity 280. In an embodiment, additional mix bags may be provided within cavity 280. Additionally, the cavity 280 may be compartmentalized by providing a plurality of rectilinear walls (not shown) in order to partition the cavity 280.

Also shown in FIG. 2, product dispensing machine 100 includes refrigerated cylinders 235, 240 that are coupled to the dispensing stations 135, 140 (FIG. 1). Each of the refrigerated cylinders 235, 240 includes a blended product that is made from at least one mix bag 225, 230 and at least one syrup bag 260, 265, or 270 and refrigerated to form the soft-serve product. In an embodiment, the contents of one or more of the syrup bags 260, 265, 270 and the contents of one or more of the mix bags 225, 230 may be mixed inside the refrigerated cylinders 235, 240. The refrigerated cylinders 235, 240 may be connected to a dedicated refrigeration system having, in one non-limiting example, an expansion valve, condenser, compressor, and evaporator circulating refrigerant and refrigerating the cylinders 235, 240. Once blended and refrigerated, the soft-serve product within the cylinders 235, 240 is dispensed from the dispensing stations 135, 140 that are connected to the cylinders 235, 240. The consistency of the soft-serve product is thicker than the individual liquid mix in mix bags 225, 230 or in syrup bags 260, 265, 270, however, this consistency may be changed by adjusting a temperature of the refrigeration cylinders 235, 240. It should be appreciated that each drawer assembly 125, 130 include respective pump rails having associated tubing configured for connecting the mix bags 225, 230 or syrup bags 260, 265, 270 to the refrigerated cylinders 235, 240.

In operation and as shown in FIGS. 1 and 2, the selectively extendable upper and lower drawer assemblies 125, 130 (FIG. 2) provide for ease of access to a user during refilling of the drawers 202, 204 as well as cleaning the plurality of tubes that connect the mix bags 225, 230 and syrup bags 260, 265, 270 within the product dispensing machine 100. In one non-limiting example, a user would replenish a refrigerated mix bag such as, for example, mix bag 225 within the machine 100 by selectively opening upper drawer assembly 125 from a closed position and extend drawer 202 to an extended position. Once extended, the user may remove a tubing 227 from the refrigerated mix bag 225 and connect the tubing 227 to a filled mix bag that is similar to mix bag 225. As the upper drawer assembly 125 is at an ergonomic height above the floor, the user does not have to bend or extend his body substantially beyond his normal standing position when placing a new mix bag into the upper drawer assembly 125. Additionally, the ergonomic height of the upper drawer assembly 125 provides full visibility to the mix bag 225 allowing the user an easier interface with the mix bag 225 and fittings. The user would insert this tubing from the depleted mix bag into the new mix bag placed in the cavity 220 and close the upper drawer assembly 125. It should be appreciated that the replenishment of a refrigerated mix bag 225 provides an adequate disclosure for the replenishment of an exemplary syrup bag 260 contained in drawer 204 of lower drawer assembly 130.

Figure 3A:
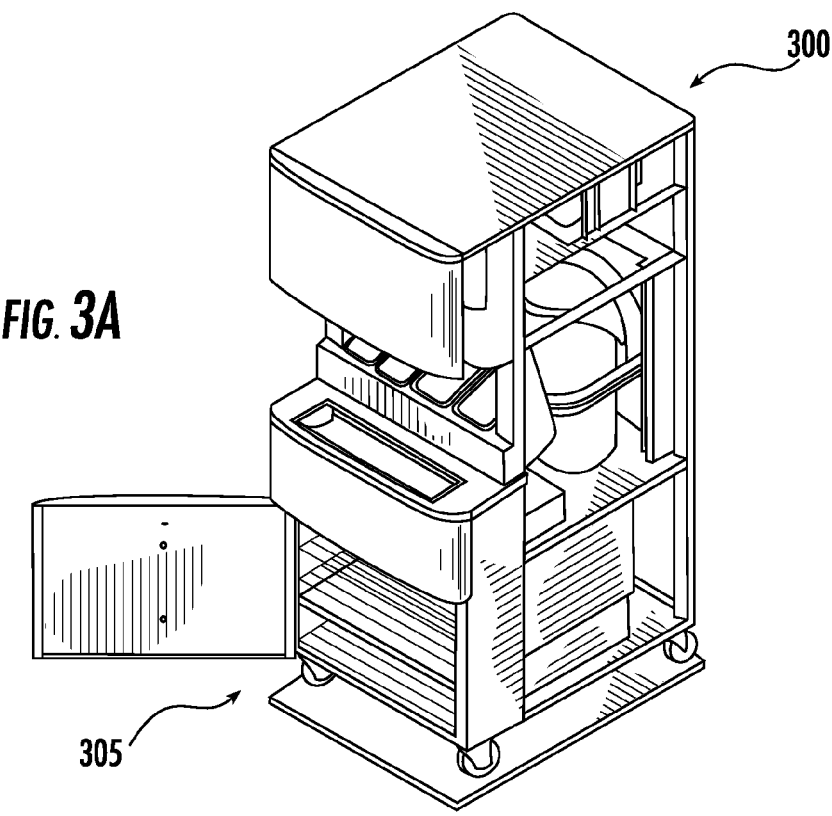
FIG. 3A depicts a perspective view of a soft-serve product dispensing machine with a cabinet according to another embodiment of the invention.
Figure 3B:
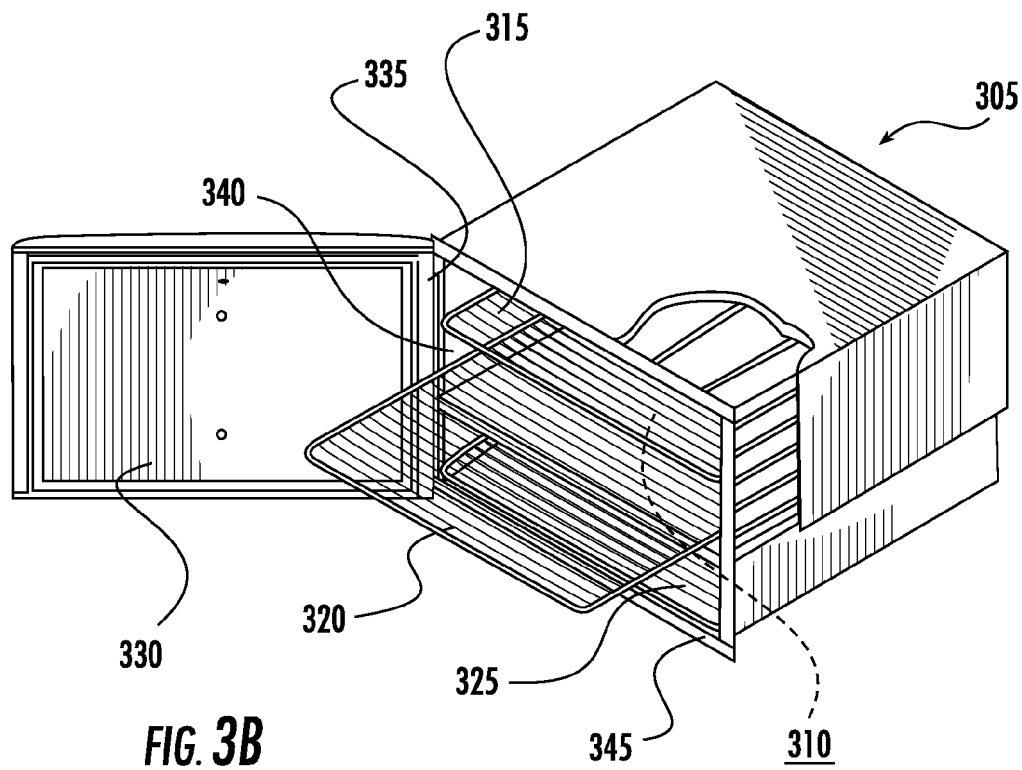
FIG. 3B depicts a perspective view of the cabinet with racks shown in FIG. 3A according to another embodiment of the invention.

In another embodiment, as shown in FIGS. 3A-3B, the product dispensing machine 300 (shown in FIG. 1) may include a cabinet 305, having one or more selectively extendable racks (or shelves), that may be used in lieu of one or both of the drawer assemblies 125, 130 (FIG. 1) of machine 100 (FIG. 1). Particularly, with reference to FIG. 3B, machine 300 (FIG. 3A) includes a cabinet 305 that encloses an interior cavity 310 thereof. In an embodiment, as shown in FIG. 3B, the cavity 310 may be refrigerated with a refrigeration system such as, for example, ducts having a forced air evaporator, direct contact with refrigeration coils via a cold wall construction, thermo-electric cooling such as a solid-state active heat pump (also called a Peltier device), or the like. But, in another embodiment, the cavity 310 may be non-refrigerated. In one non-limiting embodiment, the housing 305 includes one or more selectively extendable racks (or shelves). In the example shown in FIG. 3B, the drawer assembly 300 includes three wire racks 315, 320, 325 that may be accessible by selectively opening the door 330, but additional racks that are substantially similar to rack 315 may also be provided in other embodiments. In an embodiment, the cabinet 305 includes grooves that are provided in sides 340. The grooves receive side edges of racks 315, 320, 325 and facilitate selectively extending racks 315, 320, 325 from cavity 310 or retracting racks 315, 320, 325 back into the cavity 310. In an embodiment, as shown in FIG. 3B, a door 330 may be coupled to the cabinet 305 with hinges (not shown) that attach to a vertical edge 335. The door 330 pivots along the vertical edge 335 as it is selectively opened or closed. In another non-limiting embodiment, the door 330 may be coupled to the bottom edge 345 with hinges (not shown) that cause the door 330 to be selectively opened or closed as the door 330 pivots along the bottom edge 335. In some non-limiting examples, the door 330 may include either a translucent glass face or a transparent glass face that facilitates viewing the contents of the racks 315, 320, 325 without having to open the door 330 or a solid face that prevents a user from viewing the contents of one or more of the racks 315, 320, 325 with the door 330 in a closed position (i.e., the edges of door 330 contact the front edges of the cabinet 305).

The technical effects and benefits of exemplary embodiments include a shake or a soft-serve product dispensing apparatus having a refrigerated drawer assembly for holding refrigerated mixes and a non-refrigerated drawer assembly for holding syrups. The drawer assemblies can be accessible from a front wall or a rear wall of the machine. The drawer assemblies may be selectively extendable from a closed position to a fully extended position that extends outwards from the front wall of the product dispensing machine. The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A product dispensing apparatus, comprising:
a first drawer assembly including a first drawer configured to contain a first product;
one or more refrigerated cylinders that is operable to receive the first product;
tubing configured to connect the first product to the one or more refrigerated cylinders;
a refrigeration system for refrigerating the one or more refrigerated cylinders; and
a dispensing station configured to dispense the product from the one or more refrigerated cylinders;
wherein the first drawer is positioned beneath the one or more refrigerated cylinders and the dispensing station, the refrigeration system cooling a cavity in the first drawer;
wherein the first drawer is selectively movable from a first position to a second position, the second position extending outwards and away from the first position.

2. The apparatus of claim 1, wherein the refrigeration system is one of a roll bond evaporator, a forced air evaporator, refrigeration coils through a cold wall, or a solid-state active heat pump.

3. The apparatus of claim 1, further comprising a cabinet including a door and one or more racks.

4. The apparatus of claim 3, wherein the door is operable to pivot along an edge and selectively provide the access to the one or more racks.

5. The apparatus of claim 3, wherein the one or more racks is operable to hold a second product.

6. The apparatus of claim 5, wherein the one or more refrigerated cylinders comprises a single cylinder operable to receive the first product and the second product within a cavity therein.

7. The apparatus of claim 1, wherein the first product is refrigerated or non-refrigerated.

8. The apparatus of claim 1, wherein the first product is one of a mix, a syrup, or a flavoring.

9. The apparatus of claim 1, further comprising a second refrigeration system to refrigerate the one or more refrigerated cylinders.

10. The apparatus of claim 1, wherein the first product is contained in one of a bag, jug, carton, reusable vessel, or can.

11. The apparatus of claim 1, further comprising an additional drawer assembly that is oriented adjacent to at least one of the first drawer assembly.

12. The apparatus of claim 11, wherein the additional drawer assembly is oriented in a side-by side position to the at least one of the first drawer assembly.

13. The apparatus of claim 5, further comprising at least one second tubing configured to couple the one or more refrigerated cylinders to the second product.

14. The apparatus of claim 1, further comprising a housing including an interior cavity that receives the first drawer assembly.

15. The apparatus of claim 1, wherein the first drawer assembly is insulated.

16. The apparatus of claim 3, wherein the first drawer assembly is positioned above the cabinet, the first drawer assembly and the cabinet being horizontally positioned with respect to each other.

17. The apparatus of claim 3, wherein the first drawer assembly is positioned adjacent to the cabinet, the first drawer assembly and the cabinet being vertically positioned with respect to each other.

18. A product dispensing apparatus, comprising:
   a first drawer assembly including a first drawer configured to contain a first product and a second product;
   a refrigerated cylinder that is operable to receive both the first product and the second product;
   tubing configured to connect the first product and the second product to the refrigerated cylinder, the first product and the second product to be mixed in the refrigerated cylinder;
   a refrigeration system for refrigerating the refrigerated cylinder, the refrigeration system including a refrigerant coil evaporator adjacent to the refrigerated cylinder; and
   a dispensing station configured to dispense a mix of the first product and the second product from the refrigerated cylinder;
   wherein the first drawer is positioned beneath the refrigerated cylinder and the dispensing station, the refrigerant coil evaporator cooling a cavity in the first drawer;
   wherein the first drawer is selectively movable from a first position to a second position, the second position extending outwards and away from the first position.

* * * * *